(12) United States Patent
Baumhauer et al.

(10) Patent No.: US 8,113,772 B2
(45) Date of Patent: Feb. 14, 2012

(54) DAMPING DEVICE FOR A SHAFT OF A TURBOMACHINE

(75) Inventors: Stephane Jean Joseph Baumhauer, Massy (FR); Jerome Alain Dupeux, Vaux le Penil (FR); Francois Maurice Garcin, Paris (FR); Jean-Pierre Francois Lombard, Pamfou (FR)

(73) Assignee: SNECMA, Paris (FR)

( * ) Notice: Subject to any disclaimer, the term of this patent is extended or adjusted under 35 U.S.C. 154(b) by 867 days.

(21) Appl. No.: 12/145,085

(22) Filed: Jun. 24, 2008

(65) Prior Publication Data

US 2009/0005183 A1     Jan. 1, 2009

(30) Foreign Application Priority Data

Jun. 26, 2007   (FR) ..................................... 07 04579

(51) Int. Cl.
*F04D 29/20* (2006.01)
(52) U.S. Cl. .................. 415/174.3; 415/216.1; 415/229
(58) Field of Classification Search ............... 415/174.3, 415/216.1, 229
See application file for complete search history.

(56) References Cited

U.S. PATENT DOCUMENTS

| | | | | |
|---|---|---|---|---|
| 4,177,692 A | | 12/1979 | Irwin | |
| 4,392,681 A | * | 7/1983 | Raquet | ............................... 295/7 |
| 4,639,194 A | * | 1/1987 | Bell et al. | .................. 416/241 B |
| 5,076,755 A | * | 12/1991 | Okada | ............................. 415/17 |
| 5,403,154 A | * | 4/1995 | Ide | ................................. 415/229 |
| 7,553,123 B2 | * | 6/2009 | Casaro | ............................ 415/90 |
| 2009/0081040 A1 | * | 3/2009 | Ueno et al. | .................... 415/229 |
| 2010/0068054 A1 | * | 3/2010 | Tollner et al. | ................. 415/229 |
| 2011/0116922 A1 | * | 5/2011 | Lin | ............................... 415/229 |

FOREIGN PATENT DOCUMENTS

| | | |
|---|---|---|
| DE | 102 39 941 A1 | 4/2003 |
| EP | 1 074 762 A2 | 2/2001 |
| FR | 943193 | 3/1949 |

OTHER PUBLICATIONS

U.S. Appl. No. 12/209,537, filed Sep. 12, 2008, Le Hong, et al.
U.S. Appl. No. 12/207,009, filed Sep. 9, 2008, Garcin, et al.
U.S. Appl. No. 12/144,960, filed Jun. 24, 2008, Baumhauer, et al.
U.S. Appl. No. 12/144,994, filed Jun. 24, 2008, Baumhauer, et al.

\* cited by examiner

*Primary Examiner* — George Fourson, III
(74) *Attorney, Agent, or Firm* — Oblon, Spivak, McClelland, Maier & Neustadt, L.L.P.

(57) ABSTRACT

A hollow shaft of a turbomachine including a cylindrical wall with an inner surface portion and at one end a member for attachment to a rotor disk of the turbomachine is disclosed. The shaft also includes a damping device wherein at least one vibration-damping laminate is attached to the inner surface portion. The laminate includes at least one layer of viscoelastic material in contact with the surface portion and a counterlayer of rigid material.

11 Claims, 2 Drawing Sheets

DAMPING DEVICE FOR A SHAFT OF A TURBOMACHINE

The present invention relates to the field of turbomachines, more particularly of gas turbine engines such as turbojets or turbofans and its object is a vibration-damping device.

Aviation turbomachines consist of a plurality of bladed wheels, that is to say rotary disks at the periphery of which mobile blades are attached. These bladed wheels are assembled to cylindrical parts that are called shafts or barrels. These components are particularly sensitive parts because they have to satisfy in terms of dimensioning imperatives of mechanical resistance to rotation, temperature and aerodynamic load. All of these aspects mean that these structures are statically loaded and that, because of the imperatives of service lifetime, the vibration amplitudes that they sustain must remain low.

Since the design and tuning of a turbomachine involves the coordination of several disciplines, the dimensioning process is iterative. The vibratory dimensioning is carried out in order to prevent the presence of critical modes in the operating range. The assembly is validated at the end of the design cycle by an engine test on which the vibratory amplitudes are measured. High levels sometimes appear induced either by forced synchronous or asynchronous responses or by instabilities. The design of the shafts or barrels must therefore be repeated which is a particularly long and costly process.

The objective on the manufacturing plane is therefore to predict as early as possible in the dimensioning cycle the levels of vibratory response of the structures in order to be able to take the necessary corrective measures as early as possible in the design. Amongst these matters, mechanical damping is an important issue for the designers.

To guarantee the robustness of these parts against vibratory fatigue, one solution consists in adding to the structure specific devices serving as sources of energy dissipation. For example, through document EP 1253290, a means of damping on the blades of the compressor movable wheel is known. It comprises a layer of viscoelastic material and a stress layer. Since the profile of the blades is in the gas flow stream, the solution proposed in this document provides for hollowing out a notch in the profile of the blades and for housing the damping means therein. The surface of the blade profiles in contact with the flow therefore presents no irregularity and the gas flow is not disrupted. Such an arrangement requires an awkward machining because of the thinness of the blade. In addition, there is a risk of introducing an imbalance between the various blades on one and the same wheel leading to an unbalance.

The objective of the present invention is to attenuate the dynamic responses of a structure under synchronous or asynchronous stress, whether or not of aerodynamic origin, by the provision of dynamic damping.

The turbomachine hollow shaft, according to the invention, comprising a cylindrical wall with an inner surface portion and at one end a member for attachment to a rotor disk of the turbomachine, is characterized in that, on said inner surface portion is attached at least one vibration-damping laminate, the laminate comprising at least one layer of viscoelastic material in contact with said surface portion and a counterlayer of rigid material, said counterlayer comprising a lateral extension forming a member for mechanical attachment to the shaft and keeping the viscoelastic layer pressing against said inner surface portion.

The originality of the present invention lies in the use of a laminate of viscoelastic material with a stress layer, said laminate pressing on the structure so as to dissipate the vibratory energy of the part.

The dissipation of the vibratory energy is obtained by shearing deformation of the viscoelastic material, between the structure which deforms under dynamic stress and the stress layer pulled by inertia. This laminate is attached to the inside of the shafts or barrels and directly damps the vibration modes of the parts in question.

The invention makes it possible to increase the structural damping of a metal part and to solve a vibratory problem encountered in design: the consequence of this is finally to reduce the associated development and tuning times and hence to reduce the costs.

It also allows the widening of the conventional design fields limited by satisfying services of resistance to alternating loads and indirectly weight gains.

The invention is applicable irrespective of the type of dynamic load: crossing with engine harmonics, asynchronous or acoustic excitation, aeroelastic instability or excitation through rotor-stator contact.

According to various embodiments:
- the damping means partially covers, axially or circumferentially, said inner surface portion—the shaft comprises a plurality of damping means distributed circumferentially over the inner surface portion;
- the layers are connected together;
- the counterlayer comprises a member for mechanical attachment;
- the mechanical attachment member connects the counterlayer to the shaft;
- the member for mechanical attachment keeps the viscoelastic layer pressing against said inner surface portion;
- the laminate consists of a stack of alternating viscoelastic layers and rigid layers;
- the characteristics of the viscoelastic material vary from one layer to the other;
- the characteristics of the viscoelastic material are the same from one layer to the other;
- the characteristics of the rigid material vary from one rigid layer to the other;
- the characteristics of the rigid material are the same from one rigid layer to the other.

The invention also relates to a turbomachine comprising at least one such shaft.

Other features and advantages will emerge from the following description of various embodiments of the invention with reference to the appended drawings in which.

Figure 1:
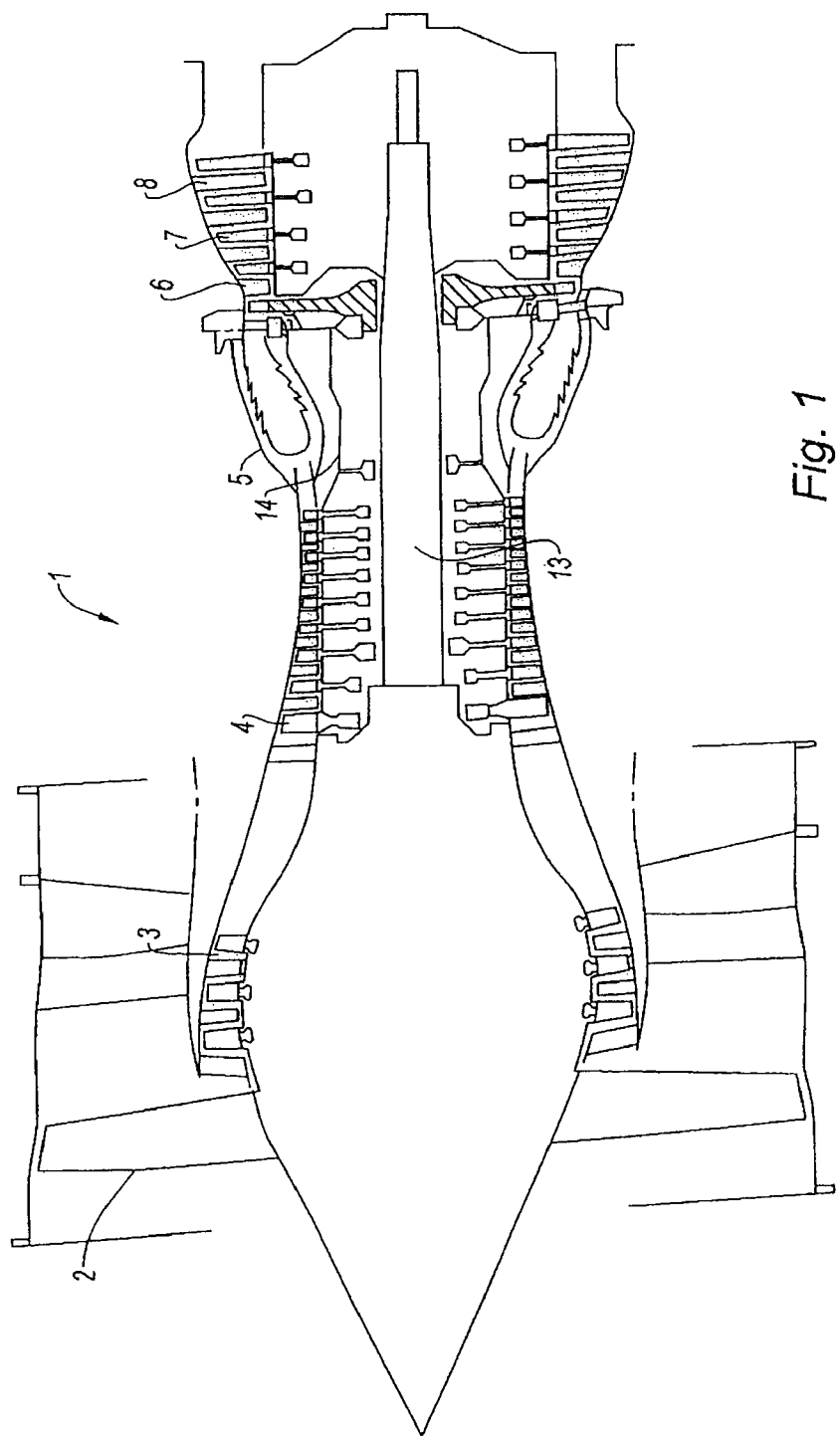
FIG. 1 represents schematically a turbojet in axial section capable of incorporating a shaft of the invention.

FIG. 1 represents schematically an example of a turbomachine in the form of a twin-spool turbofan 1. A fan 2 at the front supplies the engine with air. The air compressed by the fan is distributed into two concentric flows. The secondary flow is exhausted directly into the atmosphere and supplies an essential part of the engine thrust. The primary flow is guided through several compression stages 3 and 4 to the combustion chamber 5 where it is mixed with the fuel and burned. The hot gases supply the various turbine stages 6 and 7 which drive the fan and the compression stages. The gases are then exhausted into the atmosphere.

Structurally, such an engine comprises two rotors rotating at different speeds; an HP rotor 4-6 traversed by the "high-pressure" gases and an LP rotor 2-3-7 traversed by the "low-pressure" gases. The HP rotor comprises an HP compressor rotor 4 with a drum and the HP turbine disk 6 on either side of the combustion chamber 5 and connected via a shaft or a cylindrical barrel 14. The LP rotor comprises the fan rotor 2 and the overload compressor rotor 3 connected via a shaft 13 to an LP turbine rotor.

The invention provides dynamic vibration-damping means on inner surface portions of the shafts or cylindrical barrels connecting the rotors together.

Figure 2:
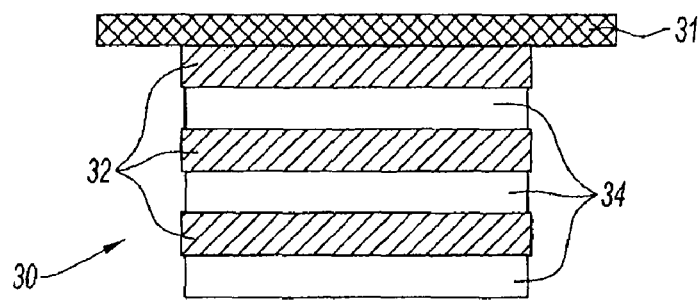
FIG. 2 represents in section a damping laminate according to the invention.

As can be seen in FIG. 2, a damping means 30 is presented in the form of a laminate with a plurality of layers stacked on one another. According to one embodiment, the laminate comprises a layer 32 of a viscoelastic material and a counterlayer 34 of a rigid material. The laminate 30 is pressed by the layer 32 against the surface of the structure to be damped.

Viscoelasticity is a property of a solid or of a liquid which, when it is deformed, shows a behavior that is both viscous and elastic by a simultaneous dissipation and storage of mechanical energy.

The characteristics, isotropic and anisotropic, of elasticity of the rigid material of the counterlayer 34 are greater than those, isotropic or anisotropic, of the viscoelastic material in the desired thermal and frequency operating range. As a non-limiting example, the material of the layer 34 may be of a metallic or composite type, the material of the layer 32 of the rubber, silicone, polymer, glass or epoxy resin type. The material must be effective in terms of energy dissipation in the expected configuration corresponding to determined temperature and frequency ranges. It is chosen from its characteristic shear moduli, expressed in deformation and speed.

According to other embodiments, the laminate comprises several layers 32 of viscoelastic material and several counterlayers 34 of rigid material, which are placed in an alternating manner. The example of FIG. 2 shows in a nonlimiting manner a damping laminate having three layers 32 of viscoelastic material and three counterlayers 34 of rigid material. According to the applications, the layers 32 of viscoelastic material and the counterlayers 34 of rigid material have equal dimensions or different dimensions. When the laminate comprises several layers 32, the latter may have all the same mechanical characteristics or else have different mechanical characteristics. When the laminate comprises several counterlayers 34, the latter may all have the same mechanical characteristics or else have different mechanical characteristics. The layers 32 and the counterlayers 34 are attached to one another preferably by adhesion by means of a film of adhesive or by polymerization.

Figure 3:
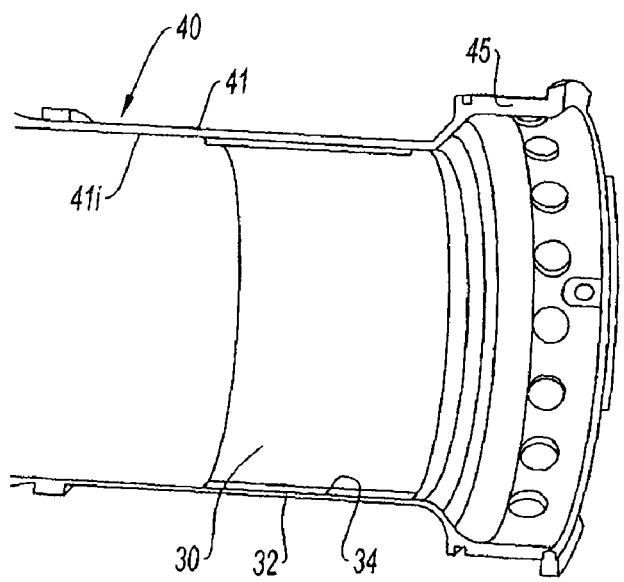
FIG. 3 represents a shaft seen in perspective fitted with a damping laminate according to the invention.

FIG. 3 shows a first embodiment. The shaft 40 of which only a portion close to one end is seen, is hollow and comprises a cylindrical wall 41. This end is provided with a member 45 for attachment to a part such as a disk of a turbine or a compressor for example. The connection is by bolting. This attachment member 45 comprises a cylindrical portion 45*b* with the same axis as the hollow shaft and with a diameter greater than the latter. It is connected via a substantially frustoconical portion 45*a* to the shaft 40. The inner surface 41*i* of the shaft comprises at least one portion of substantially straight cylindrical shape, parallel to the axis of the shaft. The laminate 30, consisting of two layers, a viscoelastic layer 32 and a rigid counterlayer 34, is attached to this surface portion 41*i*. The laminate 30 in this instance is attached by bonding or polymerization of the viscoelastic layer to the surface portion 41*i*. This laminate extends over an axial portion of the cylindrical surface portion 41*i*. Preferably, it extends circumferentially over the whole surface.

In operation, the vibration modes of the shaft are damped by the laminate without disrupting the aerodynamic flow in the gas stream.

Figure 4:
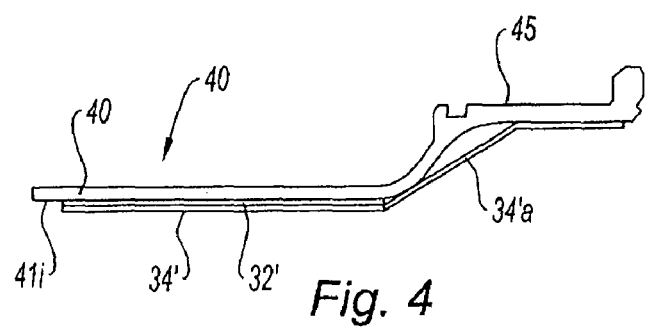
FIG. 4 shows the shaft of FIG. 3 in axial section with another embodiment of the invention.

FIG. 4 shows a second embodiment. The shaft is the same as above. The end of the shaft is provided with a member 45 for attachment to a part such as a disk of a turbine or compressor for example. The connection is by bolting. This attachment member 45 comprises a cylindrical portion 45*b* with the same axis as the hollow shaft and with a diameter that is greater at the end than the latter. It is connected via a substantially frustoconical portion 45*a* to the shaft 40. The damping laminate 30' in this instance also comprises a viscoelastic layer 32' and a rigid counterlayer 34'. The rigid counterlayer 34' comprises a lateral extension 34*a'*, that is to say an extension in the axis of the shaft, which presses on a portion of the latter. According to this example, it is the attachment member 45. The lateral extension 34*a'* comprises a frustoconical portion 34'*a*1 and a cylindrical portion 34'*a*2. The cylindrical portion 34'*a*2 presses on the inner face of the cylindrical portion 45*b* of the attachment member 45. It is bolted or secured by any other means to the attachment member 45. Preferably, the attachment comprises the bolting of the attachment member 45 to the disk with which the shaft is associated. This is how a better hold of the damping laminate is ensured during the various events which the shaft is required to withstand. In this case, the laminate is not necessarily bonded to the inner face of the shaft. The mechanical attachment is preferably arranged so as to ensure a pressure of the laminate against this surface so that, when the vibrations occur, the latter are transmitted to the viscoelastic layer.

The invention claimed is:

1. A hollow shaft of a turbomachine comprising:
    a cylindrical wall with an inner surface portion; and
    a member for attachment to a rotor disk of the turbomachine at one end,
    wherein, on said inner surface portion is attached at least one vibration-damping laminate, the laminate comprising at least one layer of viscoelastic material in contact with said surface portion and a counterlayer of rigid material comprising a lateral extension forming a member for mechanical attachment to the shaft and keeping the viscoelastic layer pressing against said inner surface portion.

2. The hollow shaft as claimed in claim 1, wherein said lateral extension is attached to said member for attaching the shaft to a rotor disk of the turbomachine.

3. The hollow shaft as claimed in claim 1 or 2, comprising a plurality of laminates distributed circumferentially over the inner surface portion.

4. The hollow shaft as claimed in claim 1, wherein the layers are connected together.

5. The hollow shaft as claimed in claim 1, wherein the laminate consists of a stack of alternating viscoelastic layers and rigid layers.

6. The hollow shaft as claimed in claim 5, wherein the characteristics of the viscoelastic material vary from one layer to the other.

7. The hollow shaft as claimed in claim 5, wherein the characteristics of the viscoelastic material are the same from one layer to the other.

8. The hollow shaft as claimed in one of claims 5 to 7, wherein the characteristics of the rigid material vary from one rigid layer to the other.

9. The hollow shaft as claimed in one of claims 5 to 7, wherein the characteristics of the rigid material are the same from one rigid layer to the other.

10. A turbomachine comprising at least one hollow shaft as claimed in claim 1.

11. The turbomachine as claimed in claim 10, comprising a compressor and wherein said shaft is connected to a disk of the compressor.

* * * * *